(12) United States Patent
Julen et al.

(10) Patent No.: US 11,809,662 B2
(45) Date of Patent: Nov. 7, 2023

(54) INTERACTIVE DISPLAY APPARATUS AND METHOD FOR OPERATING THE SAME

(71) Applicant: ABUSIZZ AG, Zermatt (CH)

(72) Inventors: Lukas Julen, Zermatt (CH); Marc Bravin, Ebikon (CH)

(73) Assignee: ABUSIZZ AG, Zermatt (CH)

( * ) Notice: Subject to any disclaimer, the term of this patent is extended or adjusted under 35 U.S.C. 154(b) by 0 days.

(21) Appl. No.: 17/907,812

(22) PCT Filed: Mar. 4, 2021

(86) PCT No.: PCT/EP2021/055477
§ 371 (c)(1),
(2) Date: Aug. 29, 2022

(87) PCT Pub. No.: WO2021/175997
PCT Pub. Date: Sep. 10, 2021

(65) Prior Publication Data
US 2023/0146023 A1  May 11, 2023

(30) Foreign Application Priority Data
Mar. 4, 2020 (CH) .................................. 00260/20

(51) Int. Cl.
*G06F 3/042* (2006.01)
*G09G 3/00* (2006.01)

(52) U.S. Cl.
CPC ............ *G06F 3/0425* (2013.01); *G09G 3/002* (2013.01); *G06F 2203/04101* (2013.01); *G09G 2354/00* (2013.01)

(58) Field of Classification Search
CPC ........ G06F 3/0425; G06F 2203/04101; G09G 3/002; G09G 2354/00
See application file for complete search history.

(56) References Cited

U.S. PATENT DOCUMENTS

| | | | |
|---|---|---|---|
| 8,373,678 B2* | 2/2013 | Yamada | G06F 1/1616 345/175 |
| 9,092,090 B2* | 7/2015 | Zhang | G06F 3/0425 |
| 9,652,043 B2* | 5/2017 | Kang | G06F 3/017 |
| 10,168,838 B2* | 1/2019 | Kang | G06F 3/0425 |
| 11,153,543 B2* | 10/2021 | Watanabe | G06F 3/011 |

(Continued)

FOREIGN PATENT DOCUMENTS

WO    2015/098189 A1    7/2015

*Primary Examiner* — Benyam Ketema
(74) *Attorney, Agent, or Firm* — Rankin, Hill & Clark LLP

(57) ABSTRACT

An interactive display apparatus includes a projector, a 3D sensing device, and a control unit. The projector projects, from an origin, an image defined by image data onto a projection surface. The 3D sensing device senses, in a monitored space between the origin and the projection surface, and generates 3D sensing data representative of results of the 3D sensing. The control unit is configured to compute reference surface data representative of a virtual reference surface corresponding to the projection surface, control the sensing device to generate secondary 3D sensing data, retrieve a measurement offset value, determine from the secondary 3D sensing data and the reference surface data, a measured height representative of a sum of the measurement offset value and a distance between the object and the projection surface, and generate a trigger signal.

15 Claims, 1 Drawing Sheet

(56) References Cited

U.S. PATENT DOCUMENTS

| | | | |
|---|---|---|---|
| 2003/0132913 A1* | 7/2003 | Issinski | G06F 3/017 345/158 |
| 2009/0183125 A1* | 7/2009 | Magal | A61B 8/08 715/863 |
| 2010/0231522 A1* | 9/2010 | Li | G06F 3/04883 345/169 |
| 2011/0090147 A1* | 4/2011 | Gervais | G06F 3/017 345/157 |
| 2011/0175832 A1* | 7/2011 | Miyazawa | G06F 3/04886 345/173 |
| 2011/0191690 A1* | 8/2011 | Zhang | G06F 3/0425 715/746 |
| 2011/0292347 A1* | 12/2011 | Zhang | G03B 21/00 353/121 |
| 2012/0249741 A1* | 10/2012 | Maciocci | G06T 19/006 348/51 |
| 2013/0070232 A1* | 3/2013 | Izukawa | G06F 3/0421 356/614 |
| 2013/0300659 A1* | 11/2013 | Kang | G06F 3/017 345/158 |
| 2013/0343601 A1* | 12/2013 | Jia | G06V 40/28 382/103 |
| 2014/0327610 A1* | 11/2014 | Athavale | H04N 5/33 345/156 |
| 2015/0035763 A1* | 2/2015 | Matoba | G06F 3/0421 345/173 |
| 2015/0268739 A1* | 9/2015 | Sanaullah | G06F 3/038 345/179 |
| 2017/0102829 A1* | 4/2017 | Chikaoka | G06F 3/04166 |
| 2017/0352248 A1* | 12/2017 | Shimizu | G08B 21/185 |
| 2019/0121522 A1* | 4/2019 | Davis | G02B 27/0093 |
| 2020/0293146 A1* | 9/2020 | Ferris | G06F 1/1601 |

* cited by examiner

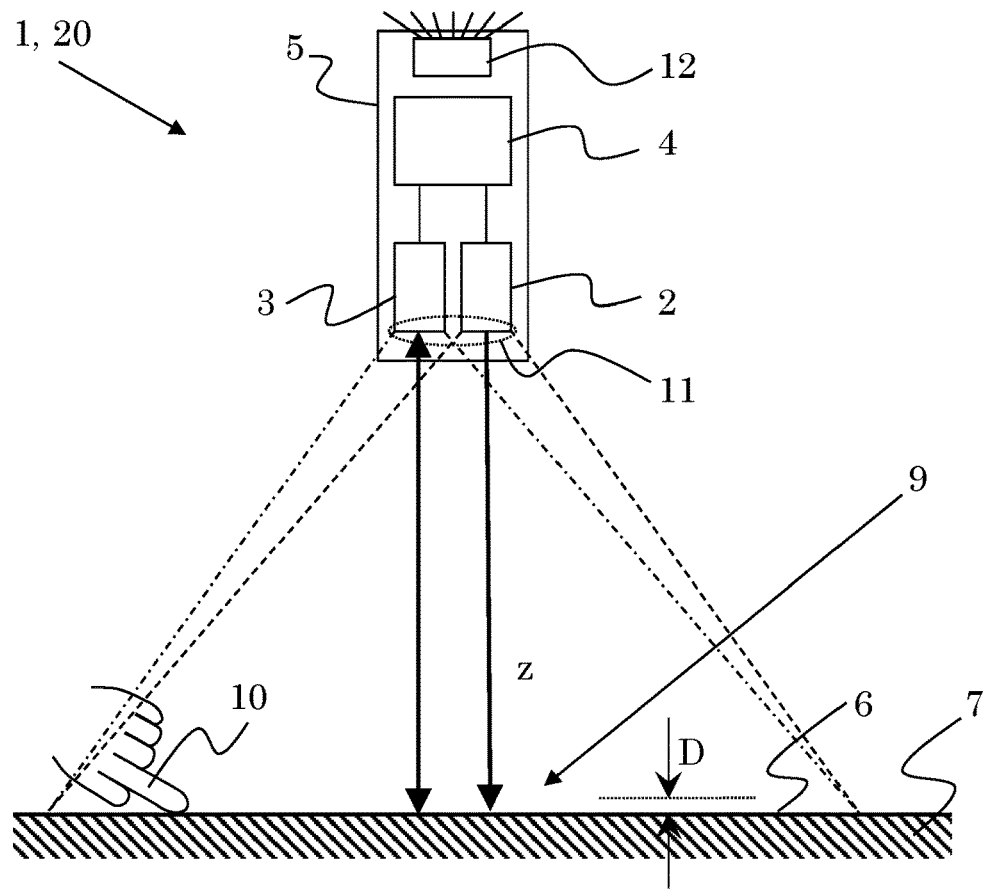
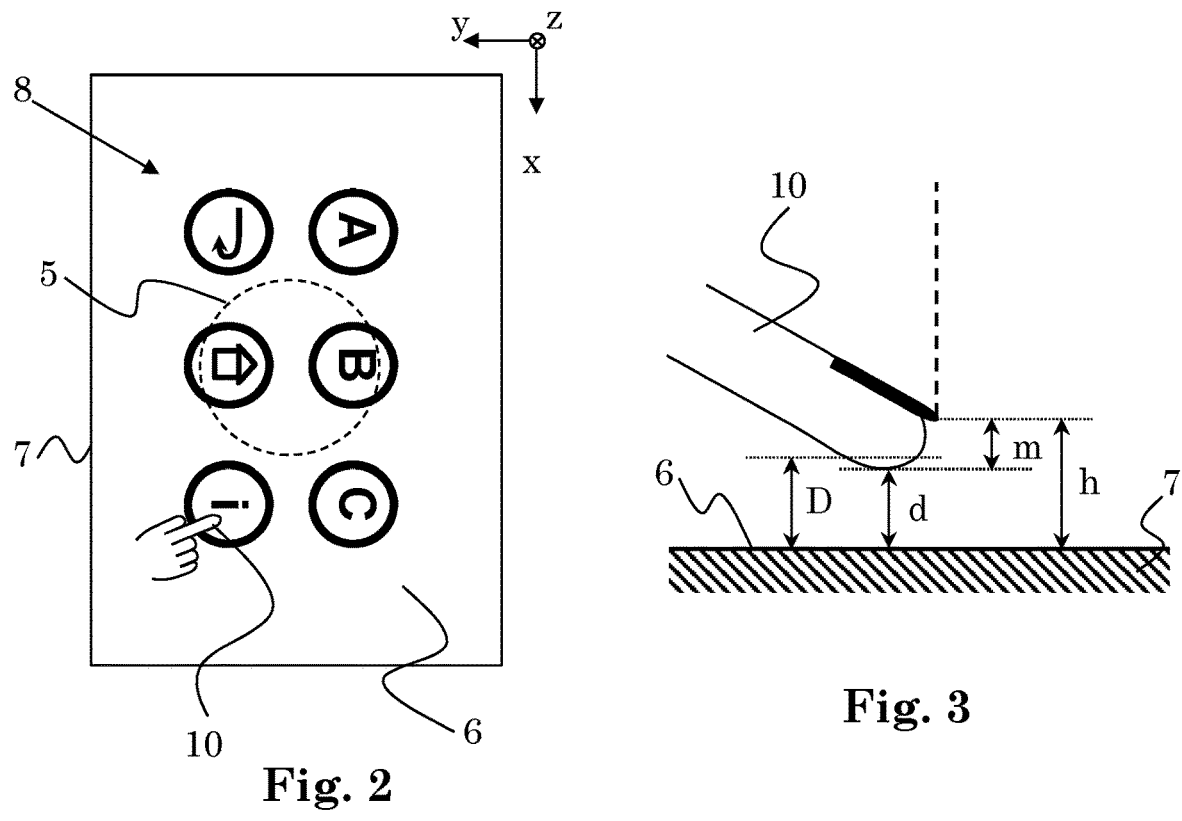
Fig. 1
Fig. 2
Fig. 3

INTERACTIVE DISPLAY APPARATUS AND METHOD FOR OPERATING THE SAME

BACKGROUND OF THE INVENTION

Field of the Invention

The invention relates to the field of gesture-based human interfaces and more particularly to an interactive display apparatus and to a method for operating an interactive display apparatus. It relates to methods and apparatuses according to the opening clauses of the claims. Such apparatuses find application, e.g., where a computing device shall be operable in an intuitive way, such as by provoking computer actions by making gestures in or near an image projected by the apparatus.

Description of Related Art

From US 2013/0343601 A1, a method for implementing a human based interface is known.

WO 2015/098189 A1 describes an interactive display system.

For enabling a flawless user experience with interactive display apparatuses, it is crucial to ensure that the time passing between a user's gesture and a user-perceivable action of the system provoked by the gesture is very short, such as, e.g., at most 30 ms, more particularly at most 20 ms. However, depending on the computing power available and on the method for recognizing the gestures, it can be difficult to reach sufficiently short response times.

SUMMARY OF THE INVENTION

One object of the invention is to provide an interactive display apparatus having an improved performance.

Another object of the invention is to enable a fast response of an interactive display apparatus to user gestures.

Another object of the invention is to provide a flawless user experience when using an interactive display apparatus.

Another object of the invention is to make possible to realize an interactive display apparatus with a relatively low computing power.

Another object of the invention is to make possible to realize an interactive display apparatus having a small or negligible latency for the detection of an event, such as of a user gesture.

Further objects and various advantages emerge from the description and embodiments below.

At least one of these objects can be at least partially achieved in some implementations of apparatuses and/or methods described in this disclosure.

The inventor contemplated that it could be advantageous to detect not, or not only, an actual gesture of a user, but an event which, at least usually, takes place briefly before the actual gesture. For example, the actual gesture can include a touch event that is accomplished by a user, such as the user's finger or hand (or another indicating object) touching the projection surface, e.g., in order to actuate a virtual switch projected in the (lateral) area where the user carries out the touch event.

Normally, one would try to detect the respective touch event itself, i.e. one would try to detect that the user's indicating object touches the projection surface. However, after the touch event has taken place, it would require some computing and therefore some time would pass, before the detection of the touch event is accomplished. Thus, a trigger signal generated in response to the detection of the touch event will be delayed with respect to the (actual; real) touch event.

In order to reduce or eliminate such a latency, it is suggested to detect a virtual touch event instead (or in addition), wherein the virtual touch event takes place briefly before the actual (physical) touch event. This can be accomplished by detecting that the indicating object is closer to (i.e., less distanced from) the projection surface than a trigger distance, wherein the trigger distance is larger than zero.

Since a user usually moves his indicating object from above the projection surface down to the surface, which may take place along a trajectory that may or may not be inclined with respect to the projection direction, such that briefly before the (actual) touch event, the virtual touch event can be detected, namely already when the indicating object is located at least as close to the projection surface as given by the trigger distance. Thus, a trigger signal can be generated very timely, possibly even before the (actual) touch event takes place.

Accordingly, a more naturally responding human-machine interface can be realized.

In particular, the interactive display apparatus can therefore include:

- a projector for projecting, e.g., from an origin, an image onto a projection surface, wherein the image is defined by image data;
- a sensing device for 3D sensing, in particular in a monitored space between the origin and the projection surface, and for generating 3D sensing data representative of results of the 3D sensing; and
- a control unit.

The control unit is operationally connected to the sensing device and can in addition be operationally connected to the projector.

The control unit can be configured for
- computing from initial 3D sensing data generated in a calibration phase by the sensing device, reference surface data which can be representative of a virtual reference surface corresponding to the projection surface;
- controlling the sensing device to generate, in an operational phase which is subsequent to the calibration phase and in which an object, such as an indicating object, is located in the monitored space, secondary 3D sensing data;
- retrieving a measurement offset value;
- determining from the secondary 3D sensing data and the reference surface data, a measured height which can be representative of a sum of the measurement offset value and a distance between the object and the projection surface;
- generating a trigger signal if the measured height minus the measurement offset value amounts to a positive non-zero trigger distance or to less than the trigger distance.

And, correspondingly, the method for operating an interactive display apparatus can include projecting, e.g., from an origin, an image defined by image data onto a projection surface. And the method can include:

- generating, by 3D sensing, in particular in a monitored space between the origin and the projection surface, initial 3D sensing data representative of results of the 3D sensing; and
- computing reference surface data from the initial 3D sensing data, wherein the reference surface data can be representative of a virtual reference surface corresponding to the projection surface; in a calibration phase.

The method can further include:

retrieving a measurement offset value.

The method can still further comprise, in an operational phase which is subsequent to the calibration phase and in which an object is located in the monitored space, generating, by 3D sensing in the monitored space, secondary 3D sensing data;

determining from the secondary 3D sensing data and the reference surface data, a measured height which can be representative of a sum of the measurement offset value and a distance between the object and the projection surface;

generating a trigger signal if the measured height minus the measurement offset value amounts to a positive non-zero trigger distance or to less than the trigger distance.

In some embodiments, the trigger signal is used to trigger a modification of the image data.

In some embodiments, the control unit is configured to trigger a modification of the image data in response to the generating of the trigger signal. The control unit can be configured for carrying out the modification.

For example, the image data can be modified so as to provide a visual feedback for the user (by the projection of the correspondingly modified image). For example, a highlighting of an icon projected in a lateral region (i.e. in the x-y-plane) where the object is located at the time of generating the secondary 3D sensing data can be caused by the modification of the image data. Or another computing action can be caused (by the control unit) in response to the generating of the trigger signal.

The image can represent a visual user interface. It can represent one or more virtual objects, such as virtual buttons.

In some embodiments, the initial 3D sensing data are identical to the reference surface data. Accordingly, the computing step can be a trivial step and/or can be omitted.

In some embodiments, the projector is operable for projecting a visual user interface.

In some embodiments, the projector is configured for top-down projection onto the projection surface.

In some embodiments, the sensing device is configured for top-down 3D sensing in the monitored, i.e., e.g., in a region adjacent to and optionally also including the projection surface.

In particular, the top-down projection and the top-down 3D sensing can be combined with one another. This way, it can be possible to have the interactive display apparatus hanging distantly above the projection surface, thus providing unimpeded access for users to the projection surface.

Furthermore, this can be well combined with the following embodiments.

In some embodiments, the projecting takes place generally along a z-direction and the 3D sensing also takes place generally along the z-direction, more particularly wherein the z-direction is aligned generally perpendicular to the projection surface. This can make the interactive display apparatus particularly space-saving. For example, both the projector and the sensing device can be disposed in a common housing—which furthermore can be particularly small.

In some embodiments, the projector and the sensing device both operate from one and the same origin.

In some embodiments, the interactive display apparatus includes a housing in which the projector and the sensing device are both disposed. Furthermore, also the control unit can be disposed in the housing.

In some embodiments, the projection surface is generally horizontally aligned and/or the z-direction is generally vertically aligned.

In some embodiments, the projection surface is formed by a tabletop of a table.

In some embodiments, the control unit is configured for detecting existence of the object from interrelating the reference surface data and the secondary 3D sensing data. For example, this can include comparing the reference surface data with the secondary 3D sensing data. The control unit can be configured for applying pattern recognition for that purpose.

The control unit can be configured for controlling the sensing device to carry out sensing steps and to generate corresponding 3D sensing data, such as the initial 3D sensing data and the secondary 3D sensing data and further 3D sensing data mentioned below.

In some embodiments, the control unit is configured to apply image processing, in particular for detecting existence of the object and/or for recognizing the object.

In some embodiments, the control unit is configured to apply pattern recognition, in particular for detecting existence of the object and/or for recognizing the object.

In some embodiments, the control unit is configured to apply a machine learning algorithm for determining the measure height.

In some embodiments, the control unit is configured to apply a machine learning algorithm for evaluating the secondary 3D sensing data.

In some embodiments, the control unit includes a microprocessor controlled controller.

In some embodiments, the control unit includes a computing device.

The microprocessor controlled controller and/or the computing device can be used, e.g., for the image processing and/or for the pattern recognition and/or for the machine learning algorithm; and can be used for the other process steps carried out by the control unit.

In some embodiments, the object is an indicating object, in particular a finger or a hand of a user.

In some embodiments, the retrieving the measurement offset value includes reading the measurement offset value from a digital memory device, such as from a memory chip provided in the control unit. The measurement offset value can be a preset value, in particular a value not directly changeable by a user.

Values of the measurement offset value can be, e.g., in the range from 3 mm to 20 mm or more particularly in the range from 4 mm to 12 mm. They can correspond to typical thicknesses of human fingers. This can be particularly useful when sensing top-down, because in that case, a measured height determined for a touch event (indicating that the object touches the projection surface) amounts approximately to the thickness of the indicating object.

In some embodiments, the retrieving the measurement offset value includes determining the measurement offset value from a set of one or more secondary 3D sensing data. The control unit can be configured to do so and furthermore to control the sensing device to carry out corresponding sensing steps for generating said one or more 3D sensing data. For example, secondary 3D sensing data can be generated during one or more touch events, and therefrom, respective one or more measured heights can be determined. A measurement offset value can be computed (e.g., by the control unit) from these one or more measured heights, e.g., by taking the most recent measured height as the measurement offset value or by computing a mean value, e.g., an arithemic mean, of the measured heights and assigning that mean value to the measurement offset value.

Determining the measurement offset value from a set of one or more secondary 3D sensing data can effectively adapt the method to different indicating objects such as to differently thick fingers of different users.

In some embodiments, the retrieving the measurement offset value includes retrieving different measurement offset values assigned to different sections of the projection plane. Such different (lateral) sections of the projection plane can be attributed, in typical situations, to different users.

Even if a measurement offset value is determined from a set of one or more secondary 3D sensing data, the method can start with a preset value, as described above.

The trigger distance can be read from a digital memory device, such as from a memory chip provided in the control unit. The trigger distance can be a preset value in the range from 5 mm to 70 mm or more particularly in the range from 10 mm to 40 mm. While larger values make possible a stronger latency reduction, they bear the risk of false trigger signal: A trigger signal might be generated in situations where the user does not intend to accomplish a touch event.

Values of the trigger distance can be, e.g., in the range from 5 mm to 70 mm or more particularly in the range from 10 mm to 40 mm. Such values have shown in practice to result in a good user experience (low latency) at a low risk of false trigger signals.

In some embodiments, the trigger distance can be determined from a set of one or more secondary 3D sensing data. For example, from secondary 3D sensing data generated briefly before and during one or more touch events, typical values of a vertical speed component of a movement of the object (in particular the indicating object) can be determined, and in dependence thereof, a suitable trigger distance value can be determined.

Determining the trigger distance from a set of one or more secondary 3D sensing data can effectively adapt the method to different users.

In some embodiments, different trigger distances can be retrieved, which can be assigned to different sections of the projection plane. Such different (lateral) sections of the projection plane can be attributed, in typical use cases, to different users.

Even if a trigger distance is determined from a set of one or more secondary 3D sensing data, the method can start with a preset value, as described above.

In some embodiments, the control unit is configured for determining from the reference surface data and 3D sensing data representative of results of 3D sensing in the monitored space subsequent to the calibration phase, whether or not an object is located in the monitored space. This can be accomplished, e.g., by image processing, e.g., by pattern recognition, and/or applying a machine-learning algorithm. The control unit can be configured to do so and furthermore to control the sensing device to carry out corresponding sensing steps for generating said 3D sensing data.

Pattern recognition can make possible, e.g., to distinguish an indicating object, e.g., a human finger, from other objects.

In some embodiments, the sensing device is a sensing device for optical 3D sensing. In particular, the 3D sensing can include light detection; and in some embodiments, it can include light emission, too. For this, the sensing device can include a light detector, e.g., an image detector, and a light emitter, e.g., a light projector, respectively.

The terms "optical" and "light" explicitely refer not only to visible light, but also to other electromagnetic radiation, such as infrared radiation. Invisible light, such as infrared light, can have the advantage that the user is not distracted by the 3D sensing, in particular if such light is emitted by the sensing device, as may be the case, e.g., for sensing devices implementing structured light and/or time-of-flight sensing.

It can be provided that light detected by the sensing device for the 3D sensing has wavelengths in a range which is free from overlap with a wavelength range of light emitted by the projector for projecting the image. This can avoid disturbances of the 3D sensing by the projected image.

In some embodiments, the sensing device includes a range imaging device.

In some embodiments, the sensing device includes a time-of-flight camera.

In some embodiments, the sensing device includes a stereo imaging device, in particular an active stereo vision device.

In some embodiments, the sensing device includes a structured light 3D sensing device.

In some embodiments, the sensing device includes a radar-based sensing device. In this case, the frequency or frequencies of the light (radiowaves) can be, e.g., in the range from 50 GHz to 70 GHz.

These technologies can be particularly suitable for the 3D sensing of the sensing device in the interactive display apparatus.

In some embodiments, the sensing device is configured to apply a machine learning algorithm in the process of generating the secondary 3D sensing data.

In some embodiments, the sensing device includes a microprocessor controlled controller and/or a computing device, such as for applying a machine learning algorithm.

In some embodiments, surface portions of objects in the monitored space facing the projection surface are not accessible to the sensing device; and/or the sensing device can access only such surface portions of objects in the monitored space which face the sensing device. For example, objects in the monitored space can have first surface portions facing the sensing device and second surface portions facing the projection surface. While the first surface portions can be represented in the 3D sensing data, the second surface portions do have no representation in the 3D sensing data; and the first and second surface portions do not share a common surface portion.

This can be the case in many of the embodiments described above, such as when the 3D sensing is accomplished in an optical fashion and/or when the projecting takes place generally along a z-direction and the 3D sensing also takes place generally along the z-direction.

This is why a direct measurement of the distance between the object and the projection surface is not possible such a way—in contrast to other methods, such as where sensing takes place not from above (as herein suggested) but in a sideways manner, such as at a grazing angle close to the projection surface, or from below the projection surface.

Thus, the value to be compared to the trigger distance, i.e. the distance between the object and the projection surface, cannot be determined directly but is determined, e.g., from the measured height and the measurement offset value related to a thickness of the object, e.g., deducting the measurement offset value from the measured height.

Furthermore, a luminare is herein described that includes an interactive display apparatus as herein described. The interactive display apparatus can be integrated in the luminare. A light source of the luminaire can be located in a housing in which also the projector and the sensing device and optionally also the control unit is located.

This way, the interactive display apparatus can be, for example, hung above a table in a completely unobstrusive, quasi camouflaged way. The surface of the tabletop of the table can form the projection surface.

Furthermore, an interactive display arrangement is herein described that includes an interactive display apparatus as herein described and a table having a tabletop. The tabletop can form the projection surface.

As will have become clear, the invention can make possible to anticipate a (real) touch event, namely by detecting a virtual touch event. And triggered by the detection of the virtual touch event, an action can be caused. Thus, the action can be caused with no or low latency.

The method can include detecting a virtual touch event, in particular the trigger signal being indicative of the virtual touch event. And the virtual touch event can be an event anticipating a (real; actual) touch event.

The invention can relate to detecting gestures which are related to a specific portion of the image—in contrast to gestures which are unrelated to a specific portion of the image such as to gestures which are independent from the image or are related to the image as a whole.

The (real; actual) touch event can be related to a specific portion of the image, in particular to a virtual object, such as virtual button, projected by the projector. The object can touch the projection surface in the portion of the image in the (real; actual) touch event.

The virtual touch event can be related to a specific portion of the image, in particular to a virtual object, such as virtual button, projected by the projector. It can be related to the same portion of the image as the (real; actual) touch event.

In response to the trigger signal, the image data can be modified to modify the image portion. This can provide a visual feedback for the user.

The invention includes apparatuses with features of corresponding methods according to the invention, and, vice versa, also methods with features of corresponding apparatuses according to the invention.

The advantages of the apparatuses basically correspond to the advantages of corresponding methods, and, vice versa, the advantages of the methods basically correspond to the advantages of corresponding apparatuses.

Further embodiments and advantages emerge from the following description and the enclosed figures and from the claims.

BRIEF DESCRIPTION OF THE DRAWINGS

Below, the invention is described in more detail by means of examples and the included drawings. In the drawings, same reference numerals refer to same or analogous elements. The figures show schematically:

FIG. 1 a schematic illustration of a method for operating an interactive display apparatus, in a sideview;

FIG. 2 a schematic illustration of the method of FIG. 1, in a topview;

FIG. 3 a schematic illustration of the method of FIGS. 1 and 2, showing a detail, in a sideview.

DETAILED DESCRIPTION OF THE INVENTION

The described embodiments are meant as examples or for clarifying the invention and shall not limit the invention.

FIG. 1 shows a schematic illustration of a method for operating an interactive display apparatus 1, in a sideview, FIG. 2 schematically illustrates the method in a topview, and FIG. 3 schematically illustrates a detail.

The interactive display apparatus 1 includes a projector 2 and a sensing device 3 that can be, as illustrated in FIG. 1, located in a housing 5 in which, optionally, also a control unit 4 of the interactive display apparatus 1 can be located.

Control unit 4 is operationally connected to the sensing device 3 and optionally also to projection device 2, as illustrated in FIG. 1.

As a further option, a light source 12 of a luminaire 20 can be located in the housing 5, such that the interactive display apparatus 1 can be integrated in a luminaire 20, the housing of the luminaire 20 and of the interactive display apparatus 1 being identical.

The interactive display apparatus 1 is arranged above a projection surface 6 which, in the illustrated example, is formed by a tabletop 7. The tabletop can belong to an ordinary table.

The projector 2 projects an image 8 onto the projection surface 6 that may include, e.g., virtual buttons, cf. FIG. 2. The projection and its outer bounds, respectively, is symbolized in FIG. 1 by dashed lines.

The sensing device 3 can monitor, by 3D sensing, a monitored space 9 adjacent and optionally also including projection surface 6. Three-dimensional position data of objects 10 in the monitored space, or more precisely, of surface portions of objects 10 that are accessible to the sensing device 3, can be generated by the sensing device 3.

The sensing is symbolized in FIG. 1 by dash-dotted lines.

Both, the projector 2 and the sensing device 3, can operate from generally one and the same origin 11, as illustrated in FIG. 1.

As illustrated, cf. the thick arrows FIG. 1, the projecting can take place generally along a z-direction, and also the 3D sensing can take place generally along the z-direction. Of course, the respective axes of the projection and of the detection, respectively, can be mutually inclined, e.g., for practical purposes, e.g., by up to a couple of degrees, such as by up to 10° or by up to 6°.

For the projection, the simple arrow in FIG. 1 illustrates that the projection takes place from the projector 2 onto the projection surface 6, and the double arrow illustrates that the detection takes place in a direction pointing to the sensing device 3 and that optionally, an illumination by the sensing device 3 can take place from the sensing device 2 towards the projection surface 6, such as when the sensing device includes a time-of-flight camera and/or includes a structured light 3D sensing device.

A user can interact with the interactive display apparatus 1 by means of an object 10, such as an indicating object, e.g., with a finger of the user.

Basically, the user can expect that he can cause a computer action when he touches the projection surface 6, such as the tabletop, in a suitable lateral region, such as in a region in which a virtual button is projected onto projection surface 6 by projector 2. For example, the user taps on the projection surface 6 in order to provoke an action, e.g., a computing action. Or the user touches the projection surface 6 and slides over the projection surface 6 in order to move a projected icon within the projected image 8.

Thus, the user expects to be able to cause a computer action by touching the projection surface 6, i.e. by causing a touch event.

Now, instead of detecting a (real) touch event (such as illustrated in FIG. 1, the finger touching the tabletop 7), a virtual touch event is detected, where the object 10 is close to but spaced from the projection surface 6 and from the tabletop 7, respectively, namely spaced therefrom by a trigger distance D or less, cf. FIGS. 1 and 3, wherein the trigger distance is positive and non-zero. Assuming that the object 10 is that close to the projection surface 6 only when it is on its way to the projection surface 6 and thus is about to touch the projection surface 6, a trigger signal can be produced already at that time—and thus before the (actual, real) touch event takes place. The trigger distance D, cf. FIGS. 1 and 3, can be retrieved, e.g., from a memory chip of control unit 4, and it can be, e.g., in the range from 5 mm to 70 mm.

This way, time is gained, and a more natural user experience can be achieved, a latency-free or low-latency operation of the interactive display apparatus 1 can be achieved.

FIG. 3 illustrates some details. Object 10 such as the schematized finger tip in FIG. 3 is distant from projection surface 6 by a distance d which is smaller than trigger distance D, and accordingly, a trigger signal would be generated in the situation illustrated in FIG. 3. Considering, however, the illustrated top-down sensing arrangement, cf. FIG. 1, distance d cannot be directly determined by sensing device 3. Only surface portions of object 10 which face upwards, i.e. towards sensing device 3 can be monitored, and their respective heights above the projecting surface 6 can be determined, e.g., from interrelating reference surface data representative of a virtual reference surface corresponding to the projection surface 6, computed from initial 3D sensing data generated in a calibration phase by the sensing device with secondary 3D sensing data generated in an operational phase, which is subsequent to the calibration phase and in which the object 10 is located in the monitored space.

For example, the reference surface data can be subtracted from the secondary 3D sensing data.

In some embodiments, the reference surface data are identical to the initial 3D sensing data. In this case, the computing step is trivial—and it can thus be omitted.

In other embodiments, the reference surface data are different from the initial 3D sensing data.

In the described way, a measured height h can be determined (FIG. 3). This can include, e.g., identifying data points in the secondary 3D sensing data that characterize or can be attributed to object 10, e.g., by means of pattern recognition, and identifying therein that data point having the smallest distance from projection surface 6. But measured height h is larger than distance d, because the sensing is carried out from above, and object 10 has a non-zero thickness. The measured height h represents the distance between the lowest accessible surface portion of object 10 and the projection surface 6, as illustrated in FIG. 3, where that lowest surface portion is a tip of a fingernail.

A measurement offset value m can be used which roughly represents the thickness of the object 10 as illustrated in FIG. 3. For example, a value for measurement offset value m can be preset. Measurement offset value m can be, e.g., in the range from 3 mm to 20 mm.

A trigger signal can be generated when measured height h minus measurement offset value m amounts trigger distance D or less, as then it can be expected that object 10 is distanced from the projection surface 6 by trigger distance D or less.

The trigger signal can be used, e.g., to produce a feedback for the user, such as by causing a modification of the image 8, e.g., a tapped-on button is briefly highlighted.

The various described method steps can be controlled and/or carried out by the control unit 4.

Various possible ways of implementing the sensing device 3 have been described herein above.

The invention claimed is:

1. An interactive display apparatus, comprising
    a projector for projecting, from an origin, an image defined by image data onto a projection surface;
    a sensing device for 3D sensing in a monitored space between the origin and the projection surface and for generating 3D sensing data representative of results of the 3D sensing; and
    a control unit operationally connected to the projector and to the sensing device, which is configured for
        computing from initial 3D sensing data generated in a calibration phase by the sensing device, reference surface data representative of a virtual reference surface corresponding to the projection surface;
        controlling the sensing device to generate, in an operational phase which is subsequent to the calibration phase and in which an object is located in the monitored space, secondary 3D sensing data;
        retrieving a measurement offset value;
        determining from the secondary 3D sensing data and the reference surface data, a measured height representative of a sum of the measurement offset value and a distance between the object and the projection surface; and
        generating a trigger signal if the measured height minus the measurement offset value amounts to a positive non-zero trigger distance or to less than the trigger distance;
    wherein the retrieving the measurement offset value comprises reading the measurement offset value from a digital memory device, and wherein the measurement offset value is a preset value in the range from 3 mm to 20 mm.

2. The interactive display apparatus according to claim 1, wherein the projector is configured for top-down projection onto the projection surface, and wherein the sensing device is configured for top-down 3D sensing in the monitored space.

3. The interactive display apparatus according to claim 1, wherein the retrieving the measurement offset value comprises determining the measurement offset value from a set of one or more secondary 3D sensing data.

4. The interactive display apparatus according to claim 1, wherein the trigger distance is in the range from 5 mm to 70 mm.

5. The interactive display apparatus according to claim 1, wherein the control unit is configured for determining from the reference surface data and 3D sensing data representative of results of 3D sensing in the monitored space subsequent to the calibration phase, whether or not an object is located in the monitored space.

6. The interactive display apparatus according to claim 1, wherein the control unit is configured to trigger a modification of the image data in response to the generating of the trigger signal.

7. The interactive display apparatus according to claim 1, wherein the sensing device comprises a range imaging device.

8. The interactive display apparatus according to claim 1, wherein the sensing device comprise one or more of a time-of-flight camera;
a stereo imaging device;
a structured light 3D sensing device
a radar-based sensing device.

9. The interactive display apparatus according to claim 1, further comprising a housing, wherein the projector and the sensing device are both disposed in the housing.

10. A luminaire, comprising a light source and an interactive display apparatus according to claim 1, wherein the interactive display apparatus is integrated in the luminaire.

11. An interactive display apparatus, comprising an interactive display apparatus according to claim 1, and a table having a tabletop, the tabletop forming the projection surface.

12. The interactive display apparatus according to claim 8, further comprising a housing, wherein the projector and the sensing device are both disposed in the housing.

13. The interactive display apparatus according to claim 9, wherein also the control unit is disposed in the housing.

14. The interactive display apparatus according to claim 12, wherein also the control unit is disposed in the housing.

15. The interactive display apparatus according to claim 2, wherein the projecting takes place generally along a z direction and the 3D sensing also takes place generally along the z direction.

* * * * *